US011543549B2

(12) United States Patent
Thore

(10) Patent No.: US 11,543,549 B2
(45) Date of Patent: Jan. 3, 2023

(54) METHOD AND SYSTEM FOR ANALYZING A RESERVOIR GRID OF A RESERVOIR GEOLOGICAL FORMATION BASED ON 4D SEISMIC IMAGES

(71) Applicant: TOTAL SE, Courbevoie (FR)

(72) Inventor: Pierre Thore, Pau (FR)

(73) Assignee: TOTAL SE, Courbevoie (FR)

(*) Notice: Subject to any disclaimer, the term of this patent is extended or adjusted under 35 U.S.C. 154(b) by 0 days.

(21) Appl. No.: 17/350,895

(22) Filed: Jun. 17, 2021

(65) Prior Publication Data

US 2021/0396899 A1 Dec. 23, 2021

(30) Foreign Application Priority Data

Jun. 22, 2020 (EP) .................................... 20305684

(51) Int. Cl.
*G01V 1/28* (2006.01)
*G01V 1/42* (2006.01)

(52) U.S. Cl.
CPC ............... *G01V 1/288* (2013.01); *G01V 1/42* (2013.01); *G01V 2210/1234* (2013.01); *G01V 2210/612* (2013.01)

(58) Field of Classification Search
CPC .......... G01V 1/288; G01V 1/41; G01V 1/306; G01V 1/345; G01V 1/308; G01V 2210/1234; G01V 2210/612; G01V 2210/6122; G01V 2210/6246; G01V 2210/6248; G01V 2210/6652
See application file for complete search history.

(56) References Cited

U.S. PATENT DOCUMENTS

| | | | |
|---|---|---|---|
| 2013/0215712 A1* | 8/2013 | Geiser | G01V 1/308 367/9 |
| 2016/0139299 A1* | 5/2016 | Leger | G01V 1/301 703/2 |
| 2017/0248718 A1* | 8/2017 | Thore | G01V 99/005 |
| 2020/0116895 A1* | 4/2020 | Gao | G01V 1/36 |

(Continued)

FOREIGN PATENT DOCUMENTS

| | | |
|---|---|---|
| GB | 2529693 A | 3/2016 |
| WO | 2009/142872 A1 | 11/2009 |

(Continued)

*Primary Examiner* — Manuel A Rivera Vargas
*Assistant Examiner* — Yaritza H Perez Bermudez
(74) *Attorney, Agent, or Firm* — Seed Intellectual Property Law Group LLP

(57) ABSTRACT

A computer implemented method for analyzing a reservoir grid modeling a reservoir geological formation is provided in which the reservoir grid corresponds to a 3D grid of cells associated to respective values of at least one geological property. The method includes obtaining a 4D seismic image of the reservoir geological formation. A skeleton of the 4D seismic image is calculated, and the skeleton extends between at least one origin and a plurality of extremities. Each point of the skeleton is associated to a value of the at least one geological property of the reservoir grid. Flow time values are calculated for a fluid flowing from the origin to the extremities along the skeleton, based on the at least one geological property values associated to the points of the skeleton. The reservoir grid is calculated based on the flow time values.

15 Claims, 3 Drawing Sheets

(56) References Cited

U.S. PATENT DOCUMENTS

| | | | |
|---|---|---|---|
| 2020/0278465 A1* | 9/2020 | Salman | G01V 1/301 |
| 2020/0301036 A1* | 9/2020 | Ramfjord | E21B 49/00 |
| 2021/0055438 A1* | 2/2021 | Shan | G01V 1/362 |
| 2021/0103064 A1* | 4/2021 | Chen | G01V 1/308 |
| 2021/0157021 A1* | 5/2021 | Fu | G01V 1/34 |
| 2021/0396897 A1* | 12/2021 | Thore | G01V 1/362 |
| 2022/0026595 A1* | 1/2022 | Dellinger | G01V 1/3852 |

FOREIGN PATENT DOCUMENTS

| | | |
|---|---|---|
| WO | 2011/149609 A1 | 12/2011 |
| WO | 2020/254851 A1 | 12/2020 |

\* cited by examiner

METHOD AND SYSTEM FOR ANALYZING A RESERVOIR GRID OF A RESERVOIR GEOLOGICAL FORMATION BASED ON 4D SEISMIC IMAGES

BACKGROUND

Technical Field

This disclosure relates to the field of reservoir geological formations modeling and exploitation and relates more particularly to a method and system for analyzing a reservoir grid based on 4D seismic images.

Description of the Related Art

In the field of hydrocarbon (oil, natural gas, shale gas, etc.) recovery from an underground reservoir geological formation, it is known to establish a simulation model of said reservoir geological formation. Such a simulation model relies on a reservoir grid to simulate the flow of fluids inside the reservoir geological formation in order to be able to optimize the recovery of hydrocarbons from the reservoir geological formation (see, e.g., GB 2529693 A).

For instance, such a simulation model may be used to predict the amount of oil that may be recovered as a function of the amount of water injected into the reservoir geological formation.

The reservoir grid represents the 3D volume of the underground reservoir geological formation as a 3D grid of cells, each cell corresponding to a volume unit of the 3D grid which may be substantially cubic or have a more complex shape. Each cell of the reservoir grid is mapped to a corresponding portion of the reservoir geological formation. Each cell of the reservoir grid is associated to values of geological properties of the corresponding portion of the reservoir geological formation. These geological properties may be, e.g., the facies (geological index), the porosity, the permeability, etc.

Of course, the main challenge when establishing the reservoir grid is to be able to have accurate geological properties values, i.e., values that match as much as possible the actual values of the reservoir geological formation.

In general, wells are drilled into the reservoir geological formation, and it is possible to measure the values of the geological properties along the well either using various logging techniques or by acquiring cores or plugs. These measured values are accurate in general. However, it is not possible to have such accurate measurements for the whole reservoir geological formation, since this would require drilling way too many wells. Hence, the values of the geological properties measured at wells are used to estimate values for portions located between the wells, by using interpolation techniques. However, these estimated values of the geological properties are not as accurate as the measured ones.

It is also possible to use, e.g., seismic measurements in order to estimate the values of geological properties between the wells.

However, such seismic measurements provide values of geophysical properties which are not direct observations of the desired geological properties (but which depend on the desired geological properties). Also, the resolution of the seismic measurements is quite low (few tens of meters) in the vertical direction compared to the desired resolution (few meters to less than a meter). Hence, even if seismic measurements can be used to derive information on the geological properties of the reservoir geological formation between the wells, the resulting accuracy is not satisfactory.

In order to improve the accuracy of the reservoir grid model, it is known to perform Assisted History Matching (AHM) by comparing measurements performed at the wells (such as pressure, fluid flows, etc.) of flow of hydrocarbon recovery with corresponding predicted values obtained by simulating the fluid flows using the reservoir grid. Hence the reservoir grid, including the values of geological properties, may be adjusted in order to have the predicted values match the measured ones.

In general, there is always a need for further improving the accuracy of reservoir grids by using any available measurement, or at least for being able to evaluate the accuracy of the reservoir grid. However, this remains a challenging task since the available measurements are either localized at the wells or are not direct observations of the desired geological properties.

BRIEF SUMMARY

The present disclosure aims at improving the situation. In particular, the present disclosure aims at overcoming at least some of the limitations of the prior art discussed above, by proposing a solution for analyzing a reservoir grid based on seismic measurements.

Also, in some embodiments, the present disclosure aims at proposing a solution for correcting the reservoir grid based on seismic measurements.

According to a first aspect, the present disclosure relates to a computer implemented method for analyzing a reservoir grid modeling a reservoir geological formation, said reservoir grid corresponding to a 3D grid of cells associated to respective values of at least one geological property, said method comprising:
  obtaining a 4D seismic image corresponding to a 3D image representing values, referred to as time lapse property values, representative of the variation of at least one geophysical property between seismic measurements performed on the reservoir geological formation and separated in time,
  calculating a skeleton for the time lapse property values of the 4D seismic image, said skeleton extending between at least one origin and a plurality of extremities of the skeleton;
  associating each point of the skeleton to a value of the at least one geological property of the reservoir grid, based on the coordinates of the points of the skeleton and on the coordinates of the cells of the reservoir grid;
  calculating flow time values for a fluid flowing from the origin to the extremities along the skeleton, based on the at least one geological property values associated to the points of the skeleton;
  analyzing the reservoir grid based on the flow time values.

Hence, the present analyzing method uses 4D seismic images (also known as time lapse seismic images) in order to analyze a reservoir grid modeling a reservoir geological formation.

A 4D seismic image corresponds basically to a 3D image which represents values, referred to as time lapse property values in the sequel, representative of the variation of at least one geophysical property between seismic measurements performed on the reservoir geological formation and separated in time by a time lapse interval. Hence, in a 4D seismic image, the fourth dimension corresponds to time. In practice, first seismic measurements are performed at a first calendar date, for instance before starting hydrocarbon recovery from the reservoir geological formation. Second seismic measurements are performed at a second calendar date, for instance one or more years after the first calendar date. The time lapse property values therefore represent the variation of the at least one geophysical property in the 3D volume of the reservoir geological formation between the first calendar date and the second calendar date.

The geophysical property considered may vary but, regardless the type of geophysical property considered, the time lapse property values will highlight how the reservoir geological formation has been modified by its exploitation, i.e., by hydrocarbon recovery. For instance, in case of oil recovery performed by injecting water into the reservoir geological formation (through an injection well), then the time lapse property values will highlight where, in the 3D volume of the reservoir geological model, the oil has been replaced by water, and thus the time lapse property values will be non-null only where the water has been able to flow, i.e., along the fluid flow paths inside the reservoir geological formation.

Then, the analyzing method calculates a skeleton of the time lapse property values of the 4D seismic image.

In shape analysis, the skeleton (or topological skeleton) of a shape is a thin version of that shape which usually emphasizes topological properties of the shape. There are different known skeletonization algorithms for calculating such a skeleton that can be used in the present disclosure. A preferred example for the calculation of the skeleton is given by the PCT patent application No PCT/IB2019/000790 (publication No WO 2020/254851 A1), the contents of which are hereby incorporated by reference.

In the case of a 4D seismic image, the skeleton calculation may use propagation from the well, since it is the origin of the modifications inside the 3D volume of the reservoir geological formation. Regardless the calculation method, the skeleton will extend between at least one origin (i.e., at least one well) and a plurality of extremities which correspond to the furthest portions of the 3D volume of the reservoir geological formation that have been reached during the time lapse interval. The calculated skeleton represents an estimated topology of the time lapse property, and the time lapse property is representative of the fluid flow paths inside the reservoir geological formation, from the origin (i.e., a well) to the extremities. The skeleton is basically a graph comprising branches corresponding to the main paths for the time lapse property of 4D seismic image.

Since the extremities of the skeleton correspond to the furthest portions of the 3D volume of the reservoir geological formation that have been reached during the time lapse interval, then flow times needed for a fluid to travel from the origin (well) to the extremities should be substantially the same for all extremities, at least in the absence of a barrier (structural like a ceiling fault or petrophysical like a drastic diminution of permeability). Accordingly, the analyzing method then uses the skeleton as a model of fluid flow paths inside the reservoir geological formation, to simulate the flow time needed for a fluid to flow from the origin to the extremities of the skeleton, using the geological properties values given by the reservoir grid for the successive points of the skeleton. In other words, the skeleton provides the fluid flow paths while the reservoir grid provides the values of geological properties that influence the flowing of fluids, such as the pressure, the permeability, etc.

Then the accuracy of the reservoir grid, and in particular the accuracy of the values of the geological properties, can be evaluated based on the calculated flow time values. If the calculated flow time values are substantially identical, then this implies that the values of the geological properties associated to the skeleton are probably accurate. If the calculated flow time value for an extremity is significantly different than the other calculated flow time values, it might mean that along the skeleton path that join the origin to this extremity some of the values of the geological properties used in the calculation are erroneous. If the calculated flow time value for an extremity is substantially lower than the other calculated flow time values, then this implies the likely presence of a barrier at the considered extremity, and it is possible to check that this barrier is also modeled in the reservoir grid, etc.

It should be noted that the reservoir grid alone can also be used to calculate flow time values from the cell of the reservoir grid which corresponds to the origin to the cells of the reservoir grid which correspond to the extremities of the skeleton (i.e., without using the fluid flow paths defined by the skeleton). However, in such a case, it is not possible to differentiate inaccuracies on the values of geological properties from inaccuracies on the fluid flow paths simulated by the reservoir grid.

In the present disclosure, the skeleton calculated from the 4D seismic image provides the fluid flow paths, assumed to be correct since they are derived from (seismic) measurements, such that if a modeling inaccuracy is detected for the reservoir grid, it concerns necessarily the values of the geological properties provided by the reservoir grid.

In specific embodiments, the analyzing method can further comprise one or more of the following features, considered either alone or in any technically possible combination.

In specific embodiments, analyzing the reservoir grid comprises determining a reference subset of flow time values among the flow time values.

In specific embodiments, determining the reference subset of flow time values comprises discarding lowest flow time values.

In specific embodiments, determining the reference subset of flow time values comprises analyzing the evolution of intermediate flow time values calculated for points of the skeleton located between the origin and the extremities.

In specific embodiments, analyzing the reservoir grid comprises determining a reference flow time value based on the flow time values and comparing the reference flow time value with the flow time values.

In specific embodiments, analyzing the reservoir grid comprises correcting values of the at least one geological property of the reservoir grid based on the comparison of the reference flow time value with the flow time values.

In specific embodiments, correcting the values of the at least one geological property of the reservoir grid comprises:
  correcting the values of the at least one geological property associated to points of the skeleton;
  interpolating the corrected values of the at least one geological property associated to points of the skeleton in order to obtain corrected values for the reservoir grid.

In specific embodiments, correcting the values of the at least one geological property associated to points of the skeleton comprises iteratively modifying said values of the at least one geological property in order to reduce the differences between the reference flow time value and updated flow time values calculated based on the skeleton and on said modified values of the at least one geological property.

In specific embodiments, interpolating the corrected values of the at least one geological property associated to points of the skeleton comprises kriging said corrected values.

In specific embodiments, the analyzing method comprises converting the skeleton into depth scale prior to associating each point of the skeleton to a value of the at least one geological property of the reservoir grid, the skeleton being initially in time scale.

In specific embodiments, the analyzing method comprises converting the reservoir grid into time scale prior to associating each point of the skeleton to a value of the at least one geological property of the reservoir grid, the reservoir grid being initially in depth scale.

In specific embodiments, calculating a skeleton comprises applying a predetermined threshold in order to identify significant time lapse property values of the 4D seismic image, the skeleton being calculated based on said significant time lapse property values.

In specific embodiments, the at least one geological property of the reservoir grid comprises at least one among permeability, pressure, hydraulic conductivity and hydraulic transmissibility.

In specific embodiments, the time lapse property values of the 4D seismic image correspond to one among relative seismic wave velocity change values, relative acoustic impedance change values, relative time strain change values, relative density change values or water saturation change values.

According to a second aspect, the present disclosure relates to a computer program product comprising instructions which, when executed by at least one processor, configure said at least one processor to carry out an analyzing method according to any one of the embodiments of the present disclosure.

According to a third aspect, the present disclosure relates to a computer-readable storage medium comprising instructions which, when executed by at least one processor, configure said at least one processor to carry out an analyzing method according to any one of the embodiments of the present disclosure.

According to a fourth aspect, the present disclosure relates to a computer system for analyzing a reservoir grid modeling a reservoir geological formation, said computer system comprising at least one processor configured to carry out an analyzing method according to any one of the embodiments of the present disclosure.

BRIEF DESCRIPTION OF THE SEVERAL VIEWS OF THE DRAWINGS

The disclosure will be better understood upon reading the following description, given as an example that is in no way limiting, and made in reference to the figures which show.

In these figures, references identical from one figure to another designate identical or analogous elements. For reasons of clarity, the elements shown are not to scale, unless explicitly stated otherwise.

DETAILED DESCRIPTION

As discussed above, the present disclosure relates inter alia to a method 50 and system for analyzing a reservoir grid modeling a reservoir geological formation exploited for recovering hydrocarbons (oil, natural gas, shale gas, etc.) by means of at least one well.

Figure 1:
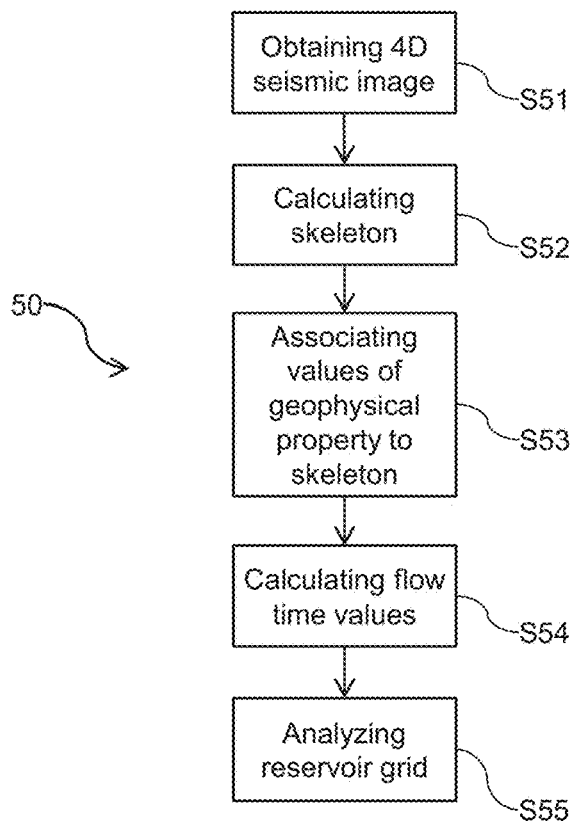
FIG. 1: a flow chart illustrating the main steps of a method for analyzing a reservoir grid.

FIG. 1 represents schematically the main steps of an exemplary embodiment of a method 50 for analyzing a reservoir grid modeling a reservoir geological formation.

The analyzing method 50 is carried out by a computer system (not represented in the figures). In preferred embodiments, the computer system comprises one or more processors (which may belong to a same computer or to different computers) and storage means (magnetic hard disk, optical disk, electronic memory, or any computer readable storage medium) in which a computer program product is stored, in the form of a set of program-code instructions to be executed in order to implement all or part of the steps of the analyzing method 50. Alternatively, or in combination thereof, the computer system can comprise one or more programmable logic circuits (FPGA, PLD, etc.), and/or one or more specialized integrated circuits (ASIC), etc., adapted for implementing all or part of said steps of the analyzing method 50. In other words, the computer system comprises a set of means configured by software (specific computer program product) and/or by hardware (processor, FPGA, PLD, ASIC, etc.) to implement the steps of the analyzing method 50.

As indicated above, the reservoir grid corresponds to a 3D grid of cells, each of the cells being associated to respective values of one or more geological properties.

The geological properties of interest are those that influence the flowing of fluids, such as the pressure and/or the permeability and/or the hydraulic conductivity and/or the hydraulic transmissivity, etc. Each value of a geological property is local in the sense that the corresponding value is for the considered cell of the reservoir grid and for the corresponding portion of the 3D volume of the reservoir geological formation.

As illustrated by FIG. 1, the analyzing method 50 comprises a step S51 of obtaining a 4D seismic image of the reservoir geological formation.

As discussed above, the 4D seismic image corresponds to a 3D image representing time lapse property values of one or more geophysical properties. The time lapse property values are representative of the variation of the geophysical properties between first seismic measurements and second seismic measurements separated in time by a time lapse interval.

Such 4D seismic images are known to the skilled person. For instance, the time lapse property values may correspond to, e.g.:

relative seismic wave velocity change ($\Delta V/V$) values, representative of the variation of the geophysical property corresponding to the seismic wave velocity V;

relative acoustic impedance change ($\Delta I_P/I_P$) values, representative of the variation of the geophysical property corresponding to the acoustic impedance $I_P$;

relative density change ($\Delta\rho/\rho$) values, representative of the variation of the geophysical property corresponding to the rock density $\rho$;

relative time strain change ($\Delta\tau/\tau$) values, representative of the variation of the geophysical property corresponding to the time strain $\tau$, wherein $\Delta\tau/\tau \approx -\Delta V/V$;

water saturation change ($\Delta S_W$) values, representative of the variation of the geophysical property corresponding to the water saturation $S_W$; etc.

As for the values of the reservoir grid, each time lapse property value of the 4D seismic image is local in the sense that the corresponding time lapse property value is for a considered volume unit of the 4D seismic image and for the corresponding portion of the 3D volume of the reservoir geological formation.

Regardless the type of geophysical property considered, the 4D seismic image is representative of how the reservoir geological formation has been modified by its exploitation via a well. For instance, in the case of an exploitation of the reservoir geological formation by means of an injection well, the 4D seismic image is representative of where hydrocarbons (e.g., oil) have been replaced by the injected fluid (e.g., water).

In the following description, we assume in a non-limitative manner that the exploitation of the reservoir geological formation uses an injecting well for injecting a fluid into said reservoir geological formation, said injected fluid pushing the hydrocarbons towards a production well.

Figure 2:
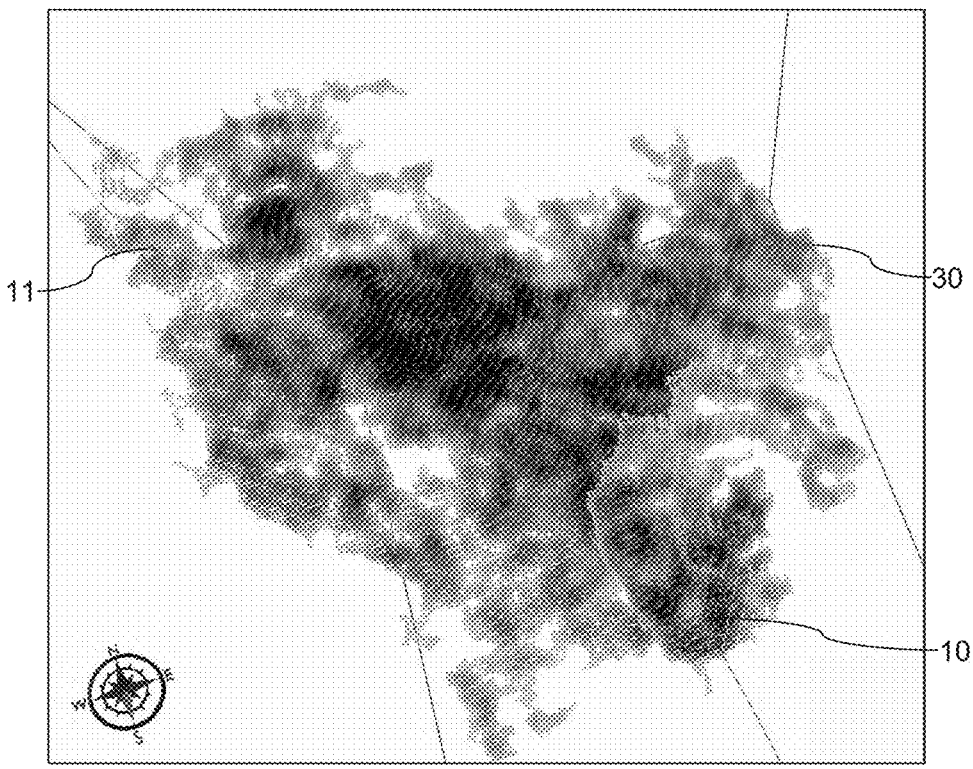
FIG. 2: a perspective view of non-null time lapse values of a 4D seismic image.

FIG. 2 represents an example of 4D seismic image, where the time lapse property values correspond to relative seismic wave velocity change $\Delta V/V$ values.

FIG. 2 also shows an injection well 10 used for hydrocarbon recovery from the reservoir geological formation. The injection well 10 is used for injecting a fluid into the reservoir geological formation, while the hydrocarbons may be recovered at a production well 11.

As indicated above, the time lapse property values are null where there have been no variations of the geophysical property considered, and the null time lapse property values are not represented in FIG. 2. By "null time lapse property values," we mean time lapse property values that are below a measurement noise level, such that the null time lapse property values are those that cannot be distinguished from noise. As illustrated by FIG. 2, the non-null time lapse property values form a complex 3D shape 30 that is representative of the 3D volume, inside the reservoir geological formation, in which the injected fluid was able to flow from the injection well 10.

In some embodiments, it is possible to apply a predetermined threshold on the time lapse property values in order to identify significant time lapse property values of the 4D seismic image. For instance, the threshold may be set to half the most significant time lapse property value of the 4D seismic image. Hence, by doing so, a filtered 4D seismic image is obtained which represents the 3D shape (volumetric distribution) of the most significant variations of the geophysical property inside the reservoir geological formation.

As illustrated by FIG. 1, the analyzing method 50 comprises a step S52 of calculating a skeleton for the time lapse property values of the 4D seismic image (or of the filtered 4D seismic image).

Skeletons are known from the field of shape analysis and have several different mathematical definitions in the scientific literature. There are different algorithms for computing them that can be used during step S52. A preferred example for the calculation of the skeleton in the context of geological data is given by the PCT patent application No PCT/IB2019/000790 (publication No WO 2020/254851 A1), the contents of which are hereby incorporated by reference.

Figure 3:
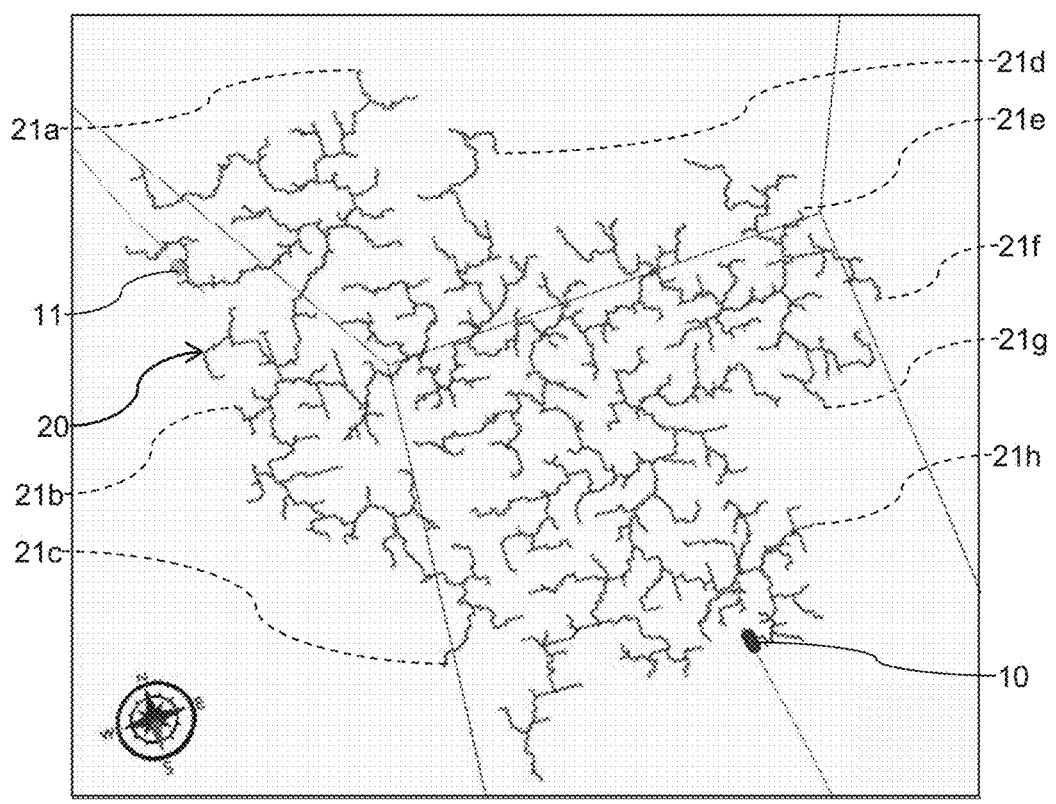
FIG. 3: a perspective view of a skeleton calculated based on the 4D seismic image of FIG. 2.

FIG. 3 represents schematically the skeleton 20 of the time lapse property values of the 4D seismic image of FIG. 2. It should be noted that applying a predetermined threshold to the time lapse property values in order to obtain a filtered 4D seismic image facilitates and accelerates the calculation of the skeleton 20.

As can be seen in FIG. 3, the skeleton 20 extends between the injection well 10, which corresponds to the origin of the fluids injected into the reservoir geological formation, and a plurality of extremities 21a-21h. For clarity purposes, not all extremities of the skeleton 20 represented in FIG. 3 have been labelled with specific reference signs. The extremities of the skeleton correspond to the different portions of the 3D volume of the reservoir geological formation that have been reached by the injected fluid during the time lapse interval.

As can be seen in FIG. 3, the skeleton 20 corresponds to a collection of interconnected points, or graph, describing the topology of the time lapse property, i.e., describing the topology of the fluid flow paths inside the reservoir geological formation, from the origin (injection well 10) to all the extremities 21a-21h.

As illustrated by FIG. 1, the analyzing method 50 comprises a step S53 of associating each point of the skeleton 20 to a value of the at least one geological property of the reservoir grid, based on the coordinates of the points of the skeleton and on the coordinates of the cells of the reservoir grid.

Indeed, each point of the skeleton 20 has coordinates in the 4D seismic image that can be matched to respective coordinates in the reservoir grid. Accordingly, each point of the skeleton 20 can be matched to a respective cell of the reservoir grid, such that the value of the at least one geological property associated to this cell may be associated to the corresponding point of the skeleton 20.

The coordinates of either a point of the skeleton 20 or of a cell of the reservoir grid can correspond, e.g., to a position in a horizontal plane combined with a position along a vertical axis. It should be noted that the coordinates in the 4D seismic image and in the reservoir grid may be expressed using different reference frames and/or different scales, such that it might be necessary to perform a conversion of the coordinates of a point of the skeleton 20 in order to find the coordinates of the corresponding cell of the reservoir grid. For instance, the vertical axis (at least) of a 4D seismic image may use a time scale (e.g., expressed in seconds) while the vertical axis of a reservoir grid may use a depth scale (e.g., expressed in meters). In that case, it might be necessary to, e.g., either convert the time scale of the vertical axis of the skeleton 20 into a depth scale or to convert the depth scale of the vertical axis of the reservoir grid into a time scale, in order to identify the cells of the reservoir grid which correspond to the points of the skeleton 20. Such a conversion may use, for instance, a predetermined seismic wave velocity field. Of course, if the 4D seismic image and the reservoir grid use the same scales and/or reference frames, then no conversion is required.

Once each point of the skeleton 20 is associated to a respective value of at least one geological property retrieved from the reservoir grid, then the analyzing method 50 comprises a step S54 of calculating flow time values for a fluid flowing, along the skeleton 20, from the origin (injection well 10) to each of the extremities of the skeleton 20, based on the skeleton 20 itself and based on the values of the at least one geological property associated to the points of the skeleton 20, retrieved from the reservoir grid.

Basically, step S54 simulates the flowing of fluid from the origin (injection well 10) to each extremity 21a-21h of the skeleton 20.

This simulation may for instance use Darcy's law to calculate the flow time values at each extremity 21a-21h of the skeleton 20. Indeed, Darcy's law is an expression which describes the flowrate of a fluid through a porous medium under influence of a pressure gradient, expressed in its integral form as:

$$Q \approx \frac{kA}{\mu L}\Delta p \quad (1)$$

$$Q \approx \frac{kA}{\mu L}\Delta p \quad (1)$$

expression in which:

Q is the flowrate (m$^3$/s);

k corresponds to the permeability (m$^2$) of the porous medium;

A corresponds to the cross-sectional area (m$^2$) of the porous medium;

µ corresponds to the dynamic viscosity of the fluid (Pa·s);

L is the length (m) of the porous medium;

ΔP is the total pressure drop along the length L.

As well known, according to expression (1), the fluid velocity v at a point p of the skeleton 20 may be approximated by the following expression:

$$v(p) \approx K(p) \cdot \nabla P(p) \quad (2)$$

expression in which:

K(p) is the hydraulic conductivity at point p, which depends on the permeability k(p) at point p;

∇P(p) is the pressure gradient at point p.

Therefore, the flow time $t_{IE}$ (n) required for reaching an extremity of index n (1≤n≤$N_E$, where $N_E$ is the number of extremities of the skeleton 20) having the coordinates E(n) from the coordinates I of the origin (injection well 10) may be expressed as:

$$t_{IE}(n) = \oint_I^{E(n)} \frac{c}{K(p) \cdot \nabla P(p)} dp \quad (3)$$

expression in which c is constant of proportionality and $\oint_I^{E(n)}$ corresponds to the curvilinear integral along the fluid flow path (given by the skeleton 20) between the origin and the extremity of index n. It should be noted that the value of c is not necessarily known and may be set to an arbitrary value.

Hence, according to expression (3), the flow time values $t_{IE}(n)$, 1≤n≤$N_E$, can be calculated if the values of the permeability (which can be used to compute K(p)) and the values of the pressure (which can be used to compute ∇P(p)) are known along the fluid flow path. Accordingly, if the values of the geological properties retrieved from the reservoir grid include the permeability (or the hydraulic conductivity) and the pressure, then the flow time values for each extremity 21a-21h can be calculated by using expression (3).

Another possible approximation for the calculation of the flow time value $t_{IE}(n)$ is given by the following expression:

$$t_{IE}(n) = \oint_I^{E(n)} \frac{c'}{K(p)} dp \quad (4)$$

expression in which c' is constant of proportionality. It should be noted that the value of c' is not necessarily known and may be set to an arbitrary value.

Accordingly, if the values of the geological properties retrieved from the reservoir grid include only the permeability (or the hydraulic conductivity), then the flow time values for each extremity 21a-21h can be calculated by using expression (4).

It should be noted that other expressions, more complicated or simpler than expression (3), can also be considered for computing the flow time values.

Also, it should be noted that intermediate flow time values may also be calculated for each fluid flow path of the skeleton 20, in addition to the flow time values $t_{IE}$ (n) calculated for the extremities of the skeleton 20. An intermediate flow time value corresponds to a flow time value for a fluid flowing from the origin (injection well 10) to an intermediate point of the skeleton 20, an intermediate point of the skeleton 20 being a point of the skeleton that is neither the origin nor an extremity 21a-21h of said skeleton 20.

Figure 4:
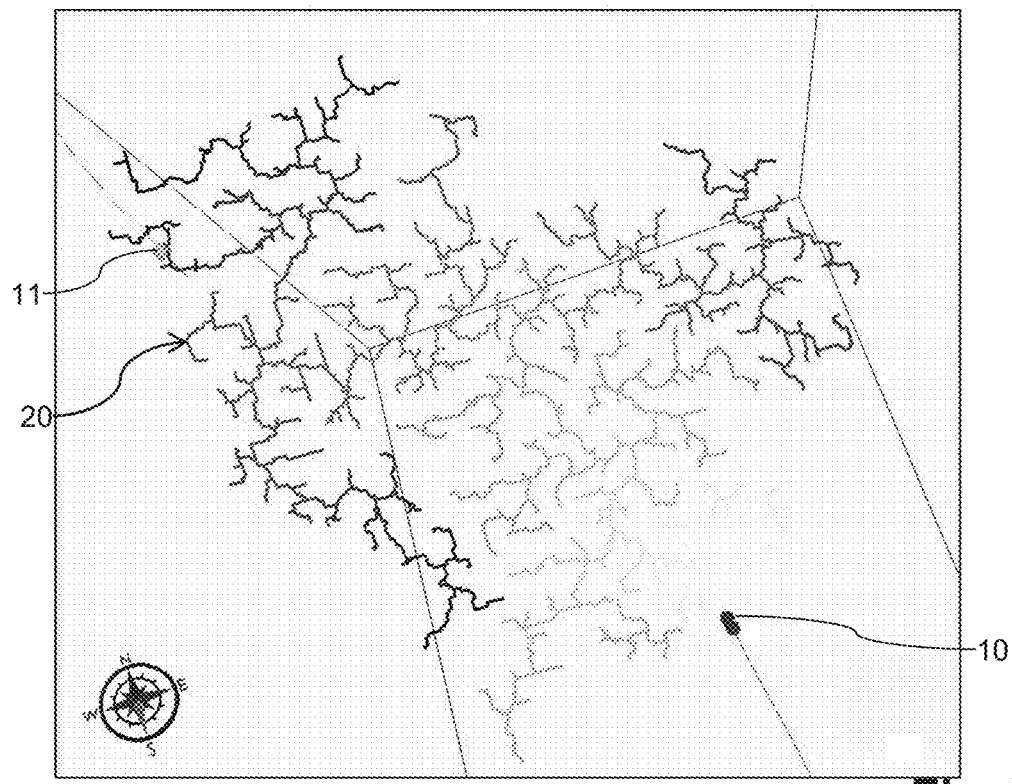
FIG. 4: a perspective view of flow time values calculated for the skeleton of FIG. 3.

FIG. 4 represents schematically the flow time values and intermediate flow time values calculated for the skeleton 20 of FIG. 3. In FIG. 4, a grayscale is used for the flow time values and intermediate flow time values, a light gray is used for low (intermediate) flow time values, while a dark gray is used for large (intermediate) flow time values. Hence, the intermediate flow time values are represented with a very light grey in the vicinity of the origin (injection well 10), while most of the flow time values calculated for the extremities are represented using different shades of dark gray.

As can be seen in FIG. 1, the analyzing method 50 then comprises a step S55 of analyzing the reservoir grid based on the calculated flow time values (and, optionally, the calculated intermediate flow time values), in order to evaluate the accuracy of the geological properties values of the reservoir grid.

Since the value of c (resp. c') is not necessarily known and may be arbitrarily set, the flow time values calculated for the extremities do not directly compare to the time lapse interval. However, the calculated flow time values may be compared between themselves since, in the absence of barriers, these flow time values should theoretically be substantially identical.

Hence, analyzing the reservoir grid based on the flow time values calculated for the extremities may comprise comparing said calculated flow time values between themselves. If there are substantial differences between calculated flow time values, then this might imply the presence of either a barrier in the reservoir geological formation and/or the presence of inaccuracies in the values of the geological properties of the reservoir grid. For instance, the differences may be considered substantial if the ratio between, on one hand, the difference between the maximum calculated flow time value and the minimum calculated flow time value and, on the other hand, the mean value of the calculated flow time values, is higher than a predetermined threshold, for instance equal to 10% or 20%, or even more.

The above comparison may also be done by discarding first the lowest calculated flow time values, likely to correspond to the presence of a barrier, and verifying whether the remaining calculated flow time values are substantially identical. If there are substantial differences between the remaining calculated flow time values, then this might imply the presence of inaccuracies in the values of the geological properties of the reservoir grid.

In preferred embodiments, the step S55 of analyzing the reservoir grid comprises determining a reference flow time value based on the calculated flow time values and comparing the reference flow time value with the calculated flow time values.

For instance, the reference flow time value may correspond to the median value of the calculated flow time values. According to another example, the lowest calculated flow time values are first discarded (e.g., the flow time values below a predetermined threshold, or the $L_E$ lowest flow time values where $L_E$ corresponds to, e.g., a predetermined percentage of $N_E$, for instance 10% or 20% of $N_E$, etc.) and the reference flow time value may correspond to the mean or median value of the remaining flow time values.

In preferred embodiments, determining the reference flow time value comprises determining a reference subset of flow time values among all the flow time values calculated for the extremities of the skeleton 20. For instance, determining the reference subset of flow time values comprises at least discarding the lowest flow time values. Preferably, determining the reference subset of flow time values comprises also analyzing the intermediate flow time values for the remaining flow time values. For instance, the flow time value for a given extremity of the skeleton may be included in the reference subset if the intermediate flow time values increase substantially linearly along the fluid flow path from the origin to this extremity. For instance, the intermediate flow time values may be considered to increase substantially linearly if the following condition is satisfied:

$$t_{IE}(m, n) - t_{IE}(m-1, n) \le R_P \frac{t_{IE}(n)}{N_P(n)}, 1 \le m \le N_P(n) \quad (5)$$

expression in which:
$N_P$ (n) is the number of points of the fluid flow path from the origin to the extremity of index n (included);
$t_{IE}$ (m, n) is the intermediate flow time value for the point of index m<$N_P$ (n) of the fluid flow path from the origin to the extremity of index n, and $t_{IE}(N_P(n), n)=t_{IE}$ (n) is the flow time value at the extremity of index n;
$R_P$ is a predetermined parameter that is higher than 1 and preferably lower than 2, for instance equal to 1,1 or 1,2.

Such a condition, among other possible conditions, enables to select automatically a suitable reference subset. However, it should be noted that, in other examples, the reference subset may also be determined manually, by an operator analyzing the calculated flow time values and, optionally, the calculated intermediate flow time values.

The reference flow time value may then be calculated based on the flow time values of the reference subset. For instance, the reference flow time value may correspond to one of the flow time values of the reference subset (e.g., the highest and/or the lowest flow time value of the reference subset), or to the mean or median value of the flow time values of the reference subset, etc.

Figure 5:
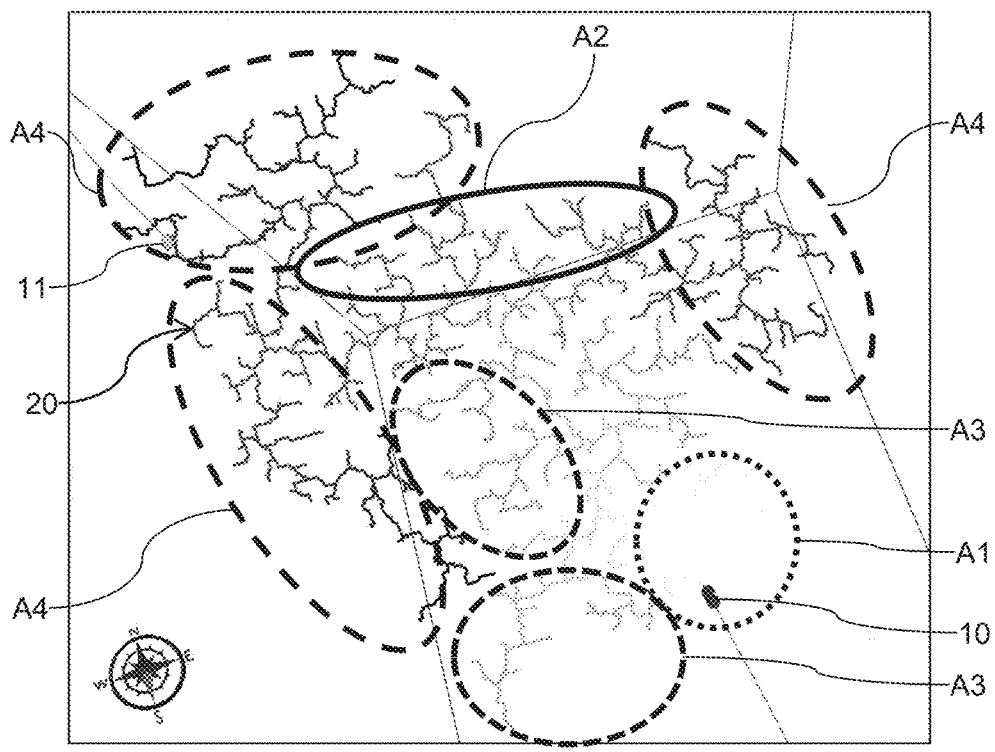
FIG. 5: a perspective view of the flow time values shown in FIG. 4, highlighting different areas of the skeleton.

FIG. 5 illustrates the evaluation of the reservoir grid based on a reference subset determined for the flow time values represented in FIG. 4.

In FIG. 5, the extremities in the area A2 correspond to those extremities having their flow time values included in the reference subset.

The extremities in the areas A4 have respective flow time values that are higher than a reference flow time value corresponding to the highest flow time value in the reference subset. Hence, this implies that the values of the geological properties, provided by the reservoir grid for the corresponding fluid flow paths reaching extremities in the areas A4, may be considered not consistent with the 4D seismic image. For a given fluid flow path and assuming the geological property is the permeability, this implies that the mean value of the permeability values along this fluid flow path should be increased in the reservoir grid.

The extremities in the areas A3 have respective flow time values that are lower than a reference flow time value corresponding to the lowest flow time value of the reference subset. For a given fluid flow path and assuming the geological property is the permeability, this implies that the mean value of the permeability values along this fluid flow path should be decreased in the reservoir grid.

The extremities in the area A1 have respective flow time values that are substantially lower than a reference flow time value corresponding to the lowest flow time value of the reference subset. Hence, this implies the likely presence of barriers in the area A1 that prevent the fluid from flowing further in the reservoir geological model. The values of the geological properties, provided by the reservoir grid for the corresponding fluid flow paths, may be correct but it should be verified whether the reservoir grid also exhibits barriers around the cells associated to the extremities in the area A1.

Hence, the analysis of the calculated flow time values enables to detect inaccuracies of values of the at least one geological property of the reservoir grid. The detected inaccuracies may be corrected, e.g., manually.

In preferred embodiments, the correction of the values of the at least one geological property of the reservoir grid is performed automatically, and the step S55 of analyzing the reservoir grid further comprises correcting the values of the at least one geological property of the reservoir grid based on the flow time values calculated for the extremities.

For instance, it is possible to correct first the values of the at least one geological property which are associated to points of the skeleton 20. Then, these corrected values of the at least one geological property, obtained for the skeleton 20, may be, e.g., interpolated in order to obtain corrected values for all or part of the cells of the reservoir grid. Such an interpolation may use any known interpolation method, such as kriging methods.

In a preferred embodiment, the problem can be formulated like a tomographic problem where rays are the fluid flow paths of the skeleton 20 and the receiver positions are the extremities 21a-21h of the fluid flow paths. For instance, the tomography may seek to find the values of the at least one geological property (e.g., the permeability) that minimize the mean square error between the flow time values and a reference flow time value:

$$\Sigma_{n=1}^{N_E}(t_{IE}(n)-t_{REF})^2 \quad (6)$$

expression in which $t_{REF}$ corresponds to the reference flow time value, for instance calculated as the mean or median value of the flow time values of the reference subset.

For instance, the expression (6) may be minimized by iteratively modifying the values of the at least one geological property of the skeleton 20 (and updating accordingly the flow time values $t_{IE}(n)$) in order to iteratively reduce the value of the expression (6). This tomography problem can be solved using, e.g., any classic Gauss Newton algorithm.

It should be noted that, when minimizing the expression (6), the values of the at least one geological property need not to be modified for all the $N_E$ fluid flow paths of the skeleton 20. For instance, and preferably, the values of the at least one geological property are not modified for the fluid flow paths corresponding to the lowest flow time values (which correspond likely to barriers in the reservoir geological formation).

The tomographic problem is under-constrained in that there are fewer data (lower or equal than $N_E$) than unknowns (values of the at least one geological property for at least all the points of the skeleton 20, significantly more than $N_E$). Accordingly, there are many possible solutions to the minimization problem. Preferably, a regularization term may be used in order, e.g., to limit the modifications of the values of the geological property and/or to have smooth modifications along the fluid flow paths or even to comply with prior information on rock type distribution in the reservoir grid and the possible range of geological property values, etc.

If the expression (3) is used to calculate the flow time values based on geological properties which correspond to the permeability (or hydraulic conductivity) and the pressure, then in a first phase the minimization may be carried out by modifying only the values of the permeability (assuming that the pressure is not modified). In a second phase, after the permeability has been updated along the skeleton 20, the pressure may be recalculated based on the updated values of the permeability (using, e.g., a flow simulator), and the minimization may be carried out another time.

Figure 6:
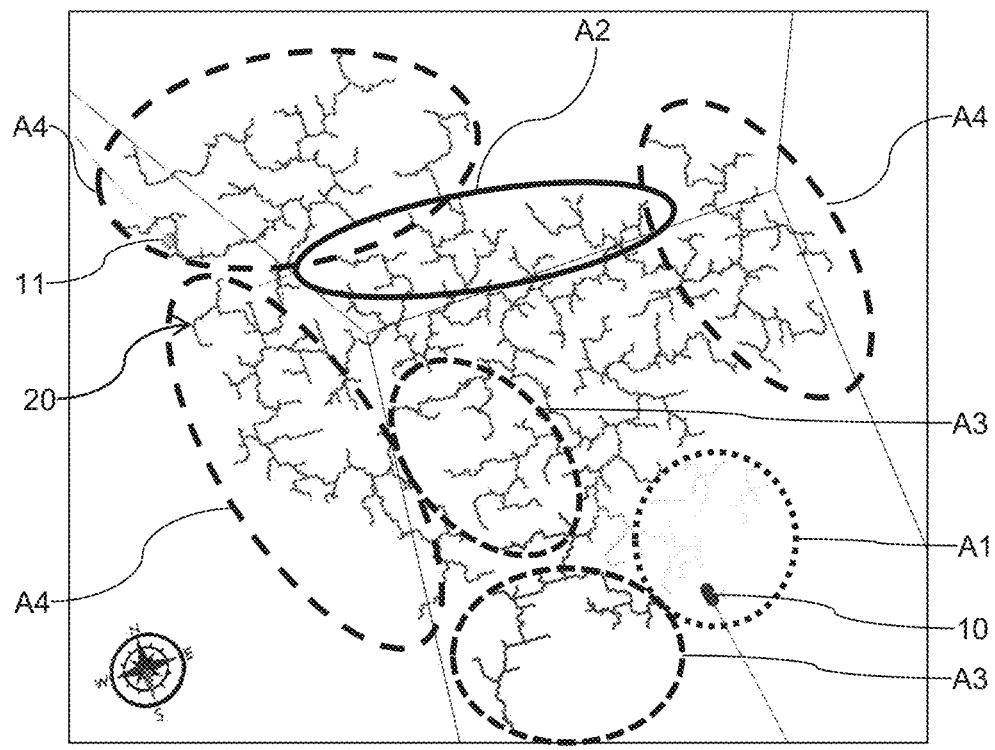
FIG. 6: a perspective view of flow time values calculated after having corrected the values of the geological properties associated to the skeleton of FIG. 3.

FIG. 6 represents schematically the flow time values and intermediate flow time values calculated based on the values of the at least one geological property obtained after correction. As can be seen in FIG. 6, all the flow time values of the extremities in the areas A2, A3 and A4 are similar. Also, the flow time values of the extremities in the area A1 have not been modified, since the presence of barriers is likely in the area A1.

As discussed above, the corrected values of the at least one geological property, obtained for the skeleton 20, may be, e.g., interpolated in order to obtain corrected values for all or part of the cells of the reservoir grid. Indeed, the corrected values obtained for the skeleton 20 can be used to update the values of the reservoir grid of the cells associated to the points of the skeleton 20. Interpolated values are then calculated for at least cells which are located between cells associated to the points of the skeleton 20.

It is emphasized that the present disclosure is not limited to the above exemplary embodiments. Variants of the above exemplary embodiments are also within the scope of the present disclosure.

For instance, the present disclosure has mainly assumed the case of a 4D seismic image of a reservoir geological formation exploited by means of an injection well 10. However, similar 4D seismic images may also be obtained for any type of well used in hydrocarbons recovery processes, and skeletons may be similarly calculated for such 4D seismic images, extending between an origin (which corresponds to the well) and a plurality of extremities.

The above description clearly illustrates that by its various features and their respective advantages, the present disclosure reaches the goals set for it, by using 4D seismic images to analyze and correct inaccuracies of a reservoir grid used for hydrocarbons recovery from a reservoir geological formation.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A computer implemented method for analyzing a reservoir grid modeling a reservoir geological formation, said reservoir grid corresponding to a 3D grid of cells associated to respective values of at least one geological property, the method comprising:

obtaining a 4D seismic image corresponding to a 3D image representing time lapse property values representative of a variation of at least one geophysical property between seismic measurements performed on the reservoir geological formation and separated in time;

calculating a skeleton for the time lapse property values of the 4D seismic image, said skeleton comprising points extending between at least one origin and a plurality of extremities;

associating each point of the skeleton to a value of the at least one geological property of the reservoir grid, based on coordinates of the points of the skeleton and on coordinates of the cells of the reservoir grid;

calculating flow time values for a fluid flowing from the at least one origin to the plurality of extremities along the skeleton, based on the values of the at least one geological property associated to the points of the skeleton; and analyzing the reservoir grid based on the flow time values.

2. The method according to claim 1, wherein analyzing the reservoir grid comprises determining a reference subset of flow time values among the flow time values.

3. The method according to claim 2, wherein determining the reference subset of flow time values comprises discarding lowest flow time values.

4. The method according to claim 2, wherein determining the reference subset of flow time values comprises:

calculating intermediate flow time values for points of the skeleton located between the at least one origin and the plurality of extremities, and analyzing an evolution of the calculated intermediate flow time values.

5. The method according to claim 1, wherein analyzing the reservoir grid comprises determining a reference flow time value based on the flow time values and comparing the reference flow time value with the flow time values.

6. The method according to claim 5, wherein analyzing the reservoir grid comprises correcting values of the at least one geological property of the reservoir grid based on the comparison of the reference flow time value with the flow time values.

7. The method according to claim 6, wherein correcting the values of the at least one geological property of the reservoir grid comprises:

correcting the values of the at least one geological property of cells of the reservoir grid associated to points of the skeleton; and interpolating the corrected values of the at least one geological property of cells of the reservoir grid associated to points of the skeleton in order to obtain corrected values for cells of the reservoir grid which are located between cells associated to point of the skeleton.

8. The method according to claim 7, wherein correcting the values of the at least one geological property of cells of the reservoir grid associated to points of the skeleton comprises iteratively modifying said values of the at least one geological property in order to reduce differences between the reference flow time and updated flow time values calculated based on the skeleton and on said modified values of the at least one geological property.

9. The method according to claim 7, wherein interpolating the corrected values of the at least one geological property of cells of the reservoir grid associated to points of the skeleton comprises kriging said corrected values.

10. The method according to claim 1, wherein calculating a skeleton comprises applying a predetermined threshold to the time lapse property values of the 4D seismic image in order to identify time lapse property values which are greater than said predetermined threshold, the skeleton being calculated based on said time lapse property values which are greater than said predetermined threshold.

11. The method according to claim 1, wherein the at least one geological property comprises at least one among permeability, hydraulic conductivity, hydraulic transmissivity or pressure.

12. The method according to claim 1, wherein the time lapse property values correspond to one among relative seismic wave velocity change values, relative acoustic impedance change values, relative time strain change values, relative density change values or water saturation change values.

13. A computer program product comprising instructions which, when executed by at least one processor, configure said at least one processor to carry out an analyzing method according to claim 1.

14. A non-transitory computer-readable storage medium containing computer instructions stored therein which, when executed by at least one processor, configure said at least one processor to carry out an analyzing method according to claim 1.

15. A computer system for analyzing a reservoir grid modeling a reservoir geological formation, said computer system comprising at least one processor and a memory, wherein said at least one processor is configured to carry out an analyzing method according to claim 1.

* * * * *